United States Patent
Jadhav et al.

(10) Patent No.: US 11,695,443 B2
(45) Date of Patent: *Jul. 4, 2023

(54) WIRELESS DEVICE PERFORMANCE OPTIMIZATION USING DYNAMIC POWER CONTROL

(71) Applicant: Apple Inc., Cupertino, CA (US)

(72) Inventors: Digvijay A. Jadhav, San Jose, CA (US); Gary Leung, San Jose, CA (US); Mark D. Neumann, El Granada, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,772

(22) Filed: Jun. 6, 2022

(65) Prior Publication Data

US 2022/0302946 A1    Sep. 22, 2022

Related U.S. Application Data

(63) Continuation of application No. 17/188,992, filed on Mar. 1, 2021, now Pat. No. 11,387,860, which is a continuation of application No. 16/787,617, filed on Feb. 11, 2020, now Pat. No. 10,965,335.

(60) Provisional application No. 62/907,347, filed on Sep. 27, 2019.

(51) Int. Cl.
*H04B 1/3827*    (2015.01)
*H04W 52/14*    (2009.01)
*H04W 52/28*    (2009.01)
*H04W 52/36*    (2009.01)

(52) U.S. Cl.
CPC ........ *H04B 1/3838* (2013.01); *H04W 52/143* (2013.01); *H04W 52/283* (2013.01); *H04W 52/367* (2013.01)

(58) Field of Classification Search
CPC .......................... H04B 1/3838; H04W 52/143; H04W 52/283; H04W 52/367
See application file for complete search history.

(56) References Cited

U.S. PATENT DOCUMENTS

| | | |
|---|---|---|
| 9,887,584 B1 | 2/2018 | Bell et al. |
| 10,368,351 B1 | 7/2019 | Syed et al. |
| 2012/0021800 A1 | 1/2012 | Wilson et al. |

(Continued)

FOREIGN PATENT DOCUMENTS

| | | |
|---|---|---|
| KR | 20120062841 A | 6/2012 |
| KR | 20130131468 A | 12/2013 |

*Primary Examiner* — Dominic E Rego
(74) *Attorney, Agent, or Firm* — Treyz Law Group, P.C.; Tianyi He

(57) ABSTRACT

A dynamic specific absorption rate (SAR) may be implemented by monitoring and controlling power utilization of the various radio frequency (RF) emitting components over time within a mobile device. Power utilization may be tracked and modified to control the time-averaged RF exposure over a rolling time window. Periodically calculations of the updated rolling averages for RF transmissions may be performed based on the transmission data received from the mobile device components, and the continuously updated rolling averages of RF transmissions may be compared to time-average power utilization limits. Based on such comparisons, the mobile device may dynamically adjust the current transmissions of the radio transceivers and other RF emitting components on the mobile device.

20 Claims, 9 Drawing Sheets

(56) References Cited

U.S. PATENT DOCUMENTS

| | | |
|---|---|---|
| 2012/0050109 A1 | 3/2012 | Nysen et al. |
| 2013/0207806 A1 | 8/2013 | Lehmann |
| 2014/0012587 A1 | 1/2014 | Park |
| 2014/0141769 A1 | 5/2014 | Brisebois et al. |
| 2015/0358128 A1 | 12/2015 | Higashinaka |
| 2015/0358979 A1 | 12/2015 | Puranik et al. |
| 2016/0049066 A1 | 2/2016 | Henderson et al. |
| 2016/0098053 A1 | 4/2016 | Khawand et al. |
| 2016/0099613 A1 | 4/2016 | Bell et al. |
| 2017/0230123 A1 | 8/2017 | Lagnado et al. |
| 2018/0048049 A1 | 2/2018 | Foivanen |
| 2019/0383865 A1 | 12/2019 | Sim et al. |

WIRELESS DEVICE PERFORMANCE OPTIMIZATION USING DYNAMIC POWER CONTROL

CROSS-REFERENCES TO RELATED APPLICATIONS

This application is a continuation of U.S. Non-Provisional application Ser. No. 17/188,992, filed Mar. 1, 2021, which is a continuation of U.S. Non-Provisional application Ser. No. 16/787,617, filed Feb. 11, 2020, now U.S. Pat. No. 10,965,335, which claims the benefit of U.S. Provisional Application No. 62/907,347, filed Sep. 27, 2019. The disclosures of these applications are incorporated by reference herein in their entireties.

BACKGROUND

Many computing devices, and in particular mobile devices such as mobile phones, tablet computers, laptops, and wearable devices and accessories may emit radio frequency (RF) energy during operation. For example, mobile devices may incorporate multiple different RF emitting components, such as a Bluetooth radio transceiver, a wireless local area network (WLAN) radio transceiver, and a cellular radio component such as a Long-Term Evolution (LTE) transceiver. Each of these RF components may emit RF energy during transmission of wireless communications via one or more antennas, and the amount of RF energy emitted may vary during operation based on the current operational mode of the component, the number of antennas, the transmission power, and the duty cycle used during transmission.

Due to the potential harm that RF energy may cause to humans, attempts have been made to control or regulate the amount of RF emissions to which users of mobile devices may be exposed. A specific absorption rate (SAR) is a measure of the amount of energy absorbed by the human body when exposed to an RF electromagnetic field. SAR regulations have been implemented to limit the amount of RF exposure to users of mobile phones and other mobile devices. Such regulations may include establishing a maximum permissible transmission power of the RF transceivers on mobile devices, and also may take into account the amount of the user's skin (e.g., tissue volume) exposed to RF emissions and the exposed location on the user (e.g., head, body, or extremities).

BRIEF SUMMARY

Techniques are described herein for implementing a dynamic specific absorption rate (SAR) by monitoring and controlling power utilization of the various components over time within a mobile device. The dynamic SAR systems and techniques described herein may provide alternative functionalities for monitoring and limiting user exposure to RF emissions from mobile devices, by tracking and enforcing time-averaged RF exposure over a rolling time window. The dynamic SAR system and components within the mobile device may monitor the RF energy emissions from the components of the mobile device, including the wireless transmissions from the various radio transceivers within the device (e.g., Bluetooth, WLAN, LTE, etc.). Specific absorption rate (SAR) may be proportional to the power conducted by the mobile device, and thus the dynamic SAR systems within the mobile device may take inputs of conducted power levels, on-times, and off-times of radio transceivers and other device components, and may use a control algorithm calculate a running SAR average. The dynamic SAR system may periodically calculate updated rolling averages for RF transmissions, based on the transmission data received from the mobile device components. The continuously updated rolling averages of RF transmissions from the device may be compared to a predetermined SAR allocation budget, and based on the comparison the mobile device may dynamically adjust the current transmissions of the radio transceivers on the mobile device in order to stay within the predetermined RF exposure limits for the current rolling time window.

In some embodiments, power utilization within a mobile device may be controlled using a power utilization control engine and various associated components executing within the mobile device. For example, the power utilization control engine may receive power utilization data for a first time window from various components of the mobile device, such as host drivers of the RF radio components on the device. The proximity of the current user to the mobile device also may be determined, including the volume of tissue and the region on the user's body exposed to the RF energy, and an RF energy exposure limit may be determined based on the proximity of the user to the mobile device. The power utilization control engine on the mobile device may then calculate a time-averaged power utilization for the various components of the mobile device, over the first time window, based on the received power utilization data. The time-averaged power utilization may be calculated for individual RF components, individual antennas, and/or for the entire mobile device. The time-averaged power utilization values may be compared to one or more thresholds based on the predetermined RF energy exposure limits, and based on the threshold comparisons, the power utilization of the various RF emitting components on the mobile device may be adjusted. As described below in more detail, the dynamic adjustments performed on the RF components may include activating/deactivating different components, increasing/decreasing transmission power, and increasing/decreasing duty cycle.

Thus, the techniques of dynamic SAR described herein may provide several technical advantages over previous techniques, including optimization of the transmissions from the mobile device. For instance, using dynamic SAR the mobile device may dynamically increase its transmission power levels above the previously allowable maximum transmission power levels, by continuously monitoring the current state of the RF emissions allocation over the current rolling time window, and decreasing the transmission power and/or duty cycle as needed. Thus, averaging the SAR over time may allow for a higher peak transmission power. The mobile device also may coordinate transceiver activations, transmission levels, and duty cycles across multiple different RF components within the mobile device (e.g., Bluetooth, WLAN, LTE, etc.), to optimize the performance of the transmission components while complying the SAR limits for the current rolling time window.

These and other embodiments of the disclosure are described in detail below. For example, other embodiments are directed to systems, devices, and computer readable media comprising computer executable instructions to perform all methods described herein.

A better understanding of the nature and advantages of embodiments of the present disclosure may be gained with reference to the following detailed description and the accompanying drawings.

DETAILED DESCRIPTION

Aspects of the present disclosure provide various techniques (e.g., methods, systems, devices, computer-readable media storing computer-executable instructions used to perform computing functions, etc.) for performance optimization of wireless devices using dynamic power utilization control. Specifically, certain techniques are described below for implementing a dynamic specific absorption rate (SAR) system, including monitoring and controlling power utilization various RF emitting components within a mobile device over time. In some embodiments, user exposure to RF energy emissions from mobile devices may be limited by monitoring, tracking, and enforcing time-averaged RF exposure over a rolling time window. In some embodiments, a power utilization control engine executing within the mobile device may monitor RF energy emissions from the RF emitting components of the mobile device, including the wireless transmissions from the various radio transceivers within the device (e.g., Bluetooth, WLAN, LTE, etc.). The power utilization control engine may periodically calculate updated rolling averages for RF transmissions, based on the transmission data received periodically from the mobile device components. The continuously updated rolling averages of RF transmissions from the device may be compared to a predetermined SAR allocation budget, and based on the comparison, the mobile device may dynamically adjust the current transmissions of the radio transceivers on the mobile device in order to stay within the predetermined RF exposure limits for the current rolling time window.

Thus, using the various features and techniques described herein, a mobile device may automatically control its transmission capabilities and other functions in order to keep the RF energy exposure to the user below a predetermined limit for a rolling time window. By receiving and analyzing data from the radio transceivers and other RF components on the mobile device, the device may determine the user's RF exposure over a recent previous time window. In the event that the user's RF exposure is approaching a limit or transmission limit for the rolling time window, the mobile device may reduce transmission power, duty cycle, and/or switch various transceivers on or off as needed to assure that the user's RF exposure stays below the limit. In other cases, if the RF's user's RF exposure is well below the limit for the rolling time window, the mobile device may increase transmission power and/or duty cycle to provide higher-quality transmission capabilities.

Figure 1:
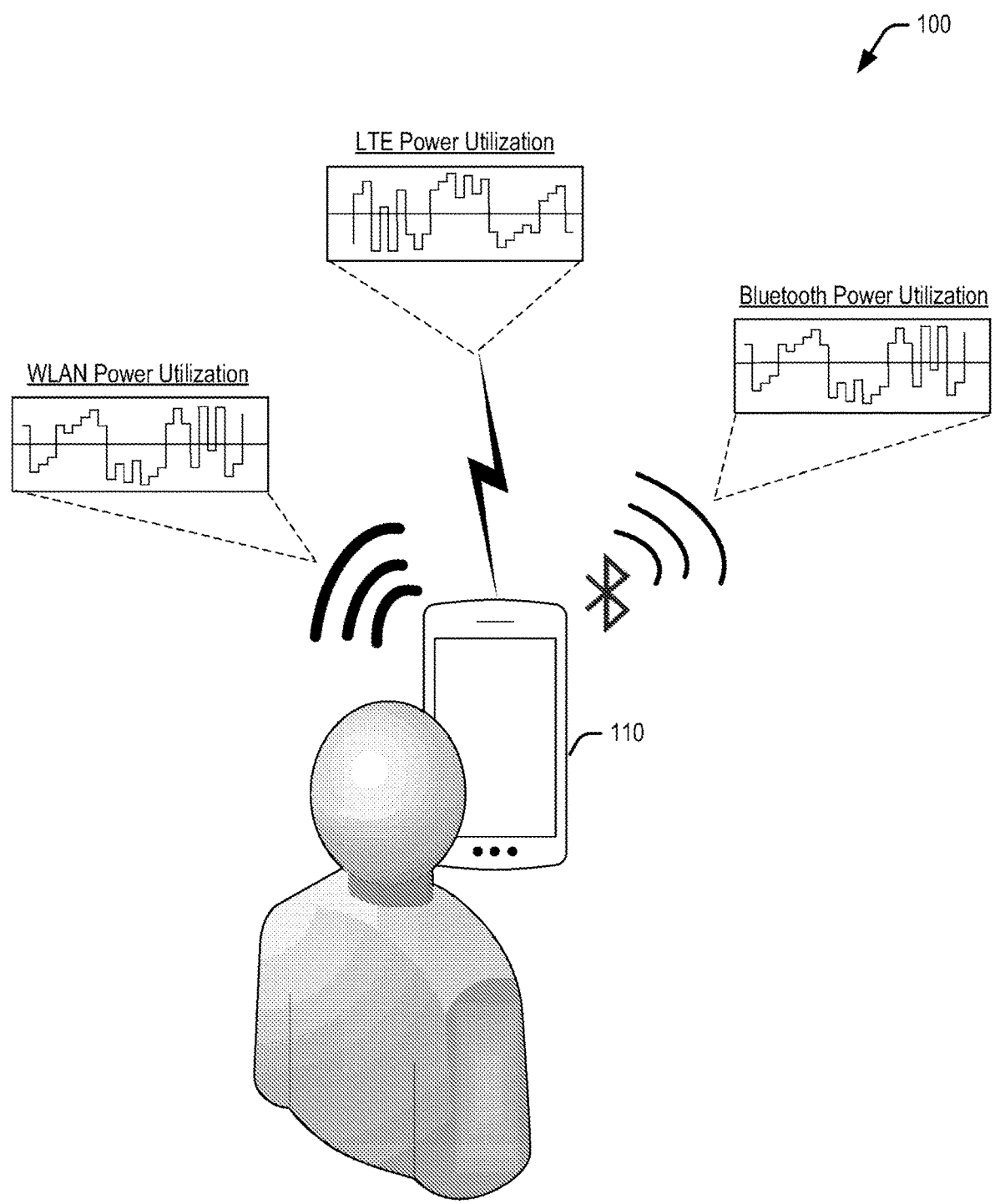
FIG. 1 is a diagram illustrating an example mobile device including multiple radio components emitting radio frequency energy, according to embodiments of the present disclosure.

FIG. 1 is a diagram illustrating an environment 100 with a mobile device 110 including multiple radio components, each emitting radio frequency (RF) energy. The mobile device 110 in this example may be, for instance, a smartphone 110 being operated by a user. As shown in this example, the smartphone 110 has at least three different RF-emitting components: a Bluetooth radio transceiver, a wireless local area network (WLAN) radio transceiver, and a cellular (e.g., LTE) radio transceiver. Each radio transceiver in this example may include one or more antennas working in coordination to establish wireless connections, transmit/receive data packets, and provide the desired network functionality to various mobile applications and communication capabilities of the smartphone 110. Further, the different radio transceivers on a mobile device 110 may operate separately and independently, so that a first radio component (e.g., a Bluetooth transceiver) might not know or have any way of discovering the current operational mode or transmitting/receiving status of the other radio components installed on the device (e.g., a WLAN and LTE transceiver), and vice versa. Although this example shows only three radio transceivers as the only RF-emitting components, in other examples mobile devices 110 may include greater or fewer RF-emitting components, and it should be noted that not all RF-emitting components need be radio transceivers.

As noted above, each of the radio transceivers of the smartphone 110 shown in this example may be emitting RF energy, in the form of an RF electromagnetic field. The amount of RF energy being emitted from a radio transceiver at a particular time may vary based on factors such as the current operational mode (e.g., activated/de-activated, transmitting/receiving, etc.), the transmission power, and the transmission duty cycle. FIG. 1 shows an example power utilization chart for each of the three radio transceivers in the smartphone 110. Because these radio transceivers operate separately and independently from each other, they may all be actively transmitting and thus emitting RF energy simultaneously, and thus the total RF energy emitted from the smartphone 110 at a particular time may be determined by aggregating of the RF emissions from the separate components.

The techniques described in more detail below relate to the monitoring and controlling of RF emissions from the radio transceivers (and/or other RF-emitting components) within a mobile device 110. For example, in some embodiments the power utilization for each of the radio transceivers in the mobile device 110 may be periodically or continuously monitored, and the power utilization readings may be used to calculate a running average of RF emissions from the mobile device 110 during a time window. The running average of RF emissions within the current time window may be compared to one or more RF emission thresholds to determine whether or not to adjust the operation of the radio transceivers. For example, when the time-average power emissions of the radio transceivers in the mobile device 110 approaches an upper limit for the time window, one or more of the radio transceivers may be reconfigured to scale back the duty cycle and/or transmission power. If the time-average power emissions exceed additional higher thresholds, one or more of the radio transceivers may be temporarily stopped or turned-off to avoid exceeding the permissible RF emissions limit during the time window. In contrast, when time-average power emissions are below certain thresholds for the current time window, the transmission power and/or duty cycles for one or more of the radio transceivers may be increased to improve transmission power and quality. Additionally, coordination between the different radio transceivers may be supported, for example, temporarily deactivating one radio transceiver in order to maintain (or even increase) the transmission power of a higher-priority radio transceiver (or higher-priority transmission).

A user of the mobile device is also depicted in this example. As noted above, RF exposure limits and the corresponding thresholds may be based not only on the amount of RF energy emitted by the mobile device, but also on the proximity of the mobile device 110 to the user which may include data such as the amount of tissue exposed to the RF emissions and the region (or part) of the user exposed to the RF emissions. Accordingly, in at least some of the embodiments described below, the mobile device 110 may be configured to use movement and orientation sensors determine when the mobile device 110 is being held by, is attached to, or is otherwise on the person of the user. The mobile device 110 also may determine or calculate the distance between the mobile device 110 (or the specific antennas of the RF transmitters) and the user, the volume of tissue on the user exposed to the RF emissions, and the part or region of the user's body exposed to the RF emissions (e.g., head, body, and/or extremities), so that some or all of this data may be used to determine an appropriate RF energy exposure limit for the user at the particular time.

Figure 2:
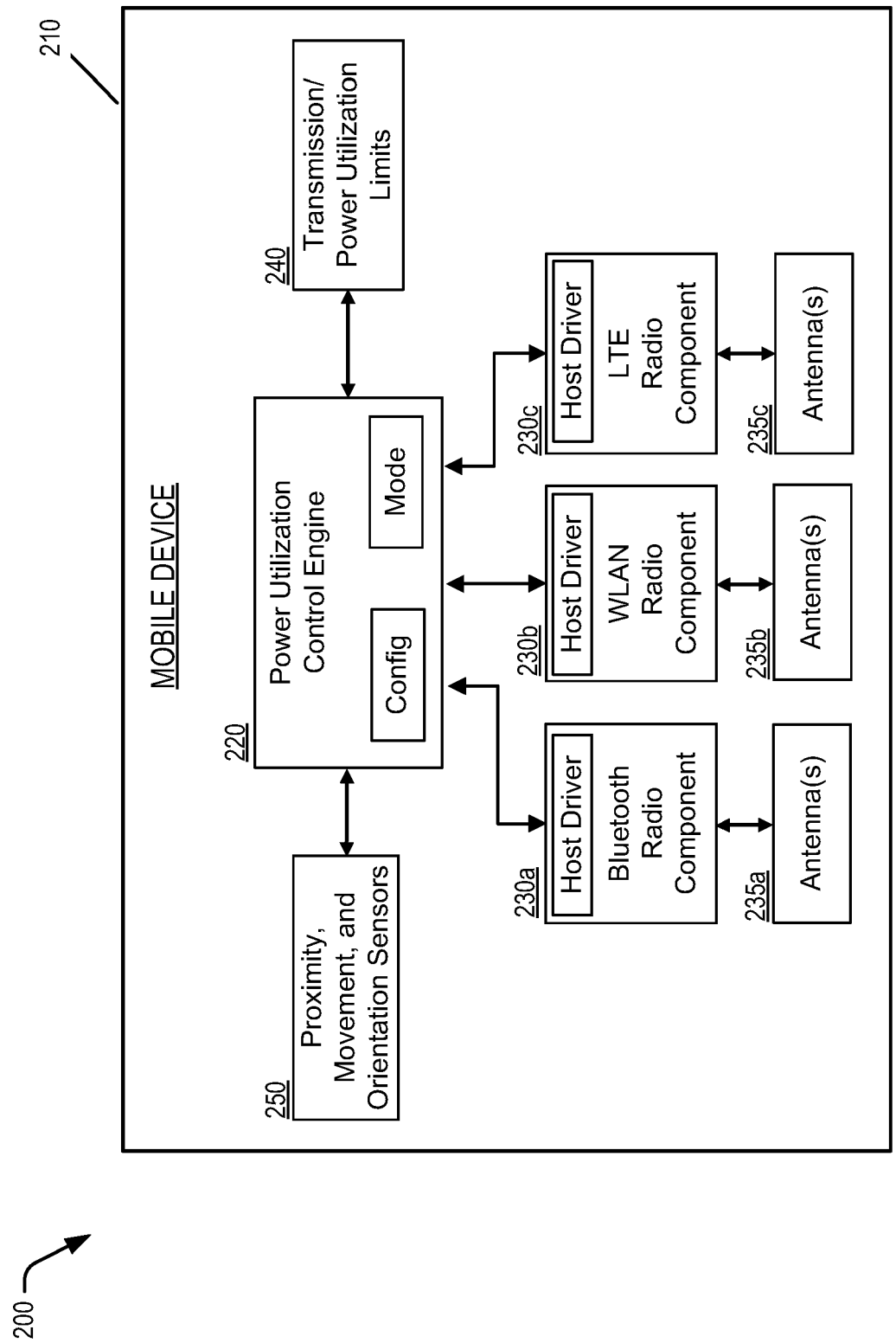
FIG. 2 is a block diagram illustrating various components of an example mobile device including a power utilization control engine, according to embodiments of the present disclosure.

FIG. 2 is a block diagram illustrating components of a dynamic specific absorption rate (SAR) control system 200 implemented within a mobile device 210. The dynamic SAR system 200 in this example may be implemented using a power utilization control engine 220 executing within the mobile device 210, and in communication with one or more radio components 230, transmission and power utilization limit data 240 which may be preconfigured and/or received from external sources, and the proximity, movement, and orientation sensors 250 of the mobile device 210.

The power utilization control engine 220 may be implemented within the mobile device 210 as a specialized software component (e.g., within the mobile operating system) and/or as a combination of dedicated hardware and software. As shown in this example, the power utilization control engine 220 may be configured to access and communicate with the host drivers of one or more radio components within the mobile device 210, both to retrieve power utilization data from host drivers for the radio components 230, and to transmit instructions to the radio components 230 via the host drivers to modify the transmission parameters and/or functionalities of the radio components 230. In this example, the mobile device 210 includes three radio components, a Bluetooth component 230a, a WLAN component 230b, and an LTE component 230c, each of which may include a separate processor and/or memory architecture, and each of which may wireless transmit/receive data via a dedicated set of antennas 235. Although only three different RF emitting components 230 are shown in this example, additional RF-emitting components (e.g., near-field communication controllers, broadcast radio components, microwave transmitters, satellite communication systems, etc.) and/or various different combinations of RF emitting components 230 may be used in other embodiments.

As discussed in more detail below, the power utilization control engine 220 may be configured to track and monitor the power utilization of the various RF-emitting components 230 within the mobile device 210. Time-averaged power utilization may be generated for a current time window, which may be updated periodically based on new transmission data received from the components 230, and the power utilization control engine 220 may use the time-average power data to enforce RF emission limits on the mobile device 210. In some cases, the limits may be stored as RF emission limits and/or power utilization limits 240, which may be preconfigured into the mobile device 210 and/or received from an external server or service to implement a set of transmission policies and/or RF emission policies onto the mobile device 210.

In addition to the RF emission and/or power utilization limits 240, which may be determined based on regulatory agencies, standards boards, or based on network-level or organization-level policies, the power utilization control engine 220 may store and use an optimization mode and/or a set of configuration parameters to customize the power utilization control functionality. In certain embodiments, various optimization modes may be supported, including a transmission power optimization mode in which the rate-at-range of transmissions may be maximized, or a latency optimization mode in which transmission power is capped but transmissions are not delayed for any radio. Another example of a configuration parameter may be an operational mode. In some embodiments, four separate operational modes may be supported: Mode 0, in which transmission power is limited by the initial transmission cap (SAR (TX CAPS), the transmission duty cycle is unrestricted, and TDMTx is Off mode (existing mode); Mode 1, in which transmission power is limited by SAR (TX CAPS), the transmission duty cycle is TDMTx version 1, and TDMTx is On mode (existing mode); Mode 2, in which transmission power is dynamically limited as MIN (PPR, CLM), which may be defined as the minimum between the PPR (which may be the per rate transmission power limits that are EVM and mask compliant) and the CLM (which may correspond to regulatory compliance limits associated with the current country and channel, but not including SAR regulations), and where the transmission duty cycle is TDMTx version 1, so that Mode 2 is optimized for maximum transmission power (e.g., may operate at (Tx Power>SAR) when allowed by the power budget utilization; and Mode 3, in which transmission power is limited by SAR (TX CAPS), and the transmission duty cycle is dynamic, so that Mode 3 is optimized for minimal delays and muting due to WLAN Simultaneous Dual Band (SDB), and Mode 3 may allow simultaneous transmission from WLAN radios when allowed by the power budget utilization. Other types of configuration parameters may include data defining the scope of RF emission limits (e.g., per antenna, per radio, per device), the length of the time window and/or of the time increments at which the time-averaged power utilization data is updated. Additional configuration parameters may include a priority between different radios and/or different communication modes, so that if a determination is made that power utilization is to be reduced then a particular radio may be selected based on the priority data.

The power utilization control engine 220 also may communicate with one or more sensors 250 of the mobile device 210, in order to detect the operation of the device and proximity of the device 210 with respect to the user. As noted above, RF exposure limits and the corresponding thresholds may be based on factors such as the proximity of the mobile device 110 to the user, the amount of the user's tissue exposed to the RF emissions, and the region (or part) of the user's body exposed to the RF emissions (e.g., head, body, or extremities). Thus, the power utilization control engine 220 may access one or more device movement, location, and/or orientation sensors to determine when the mobile device 210 is being held by, is attached to, or is otherwise on the person of the user, as well as the distance between the mobile device 210 (or the specific antennas of the RF transmitters) and the user, the volume of tissue on the user exposed to the RF emissions from the mobile device 210, and the specific part(s) of the user's body exposed to the RF emissions.

Figure 3:
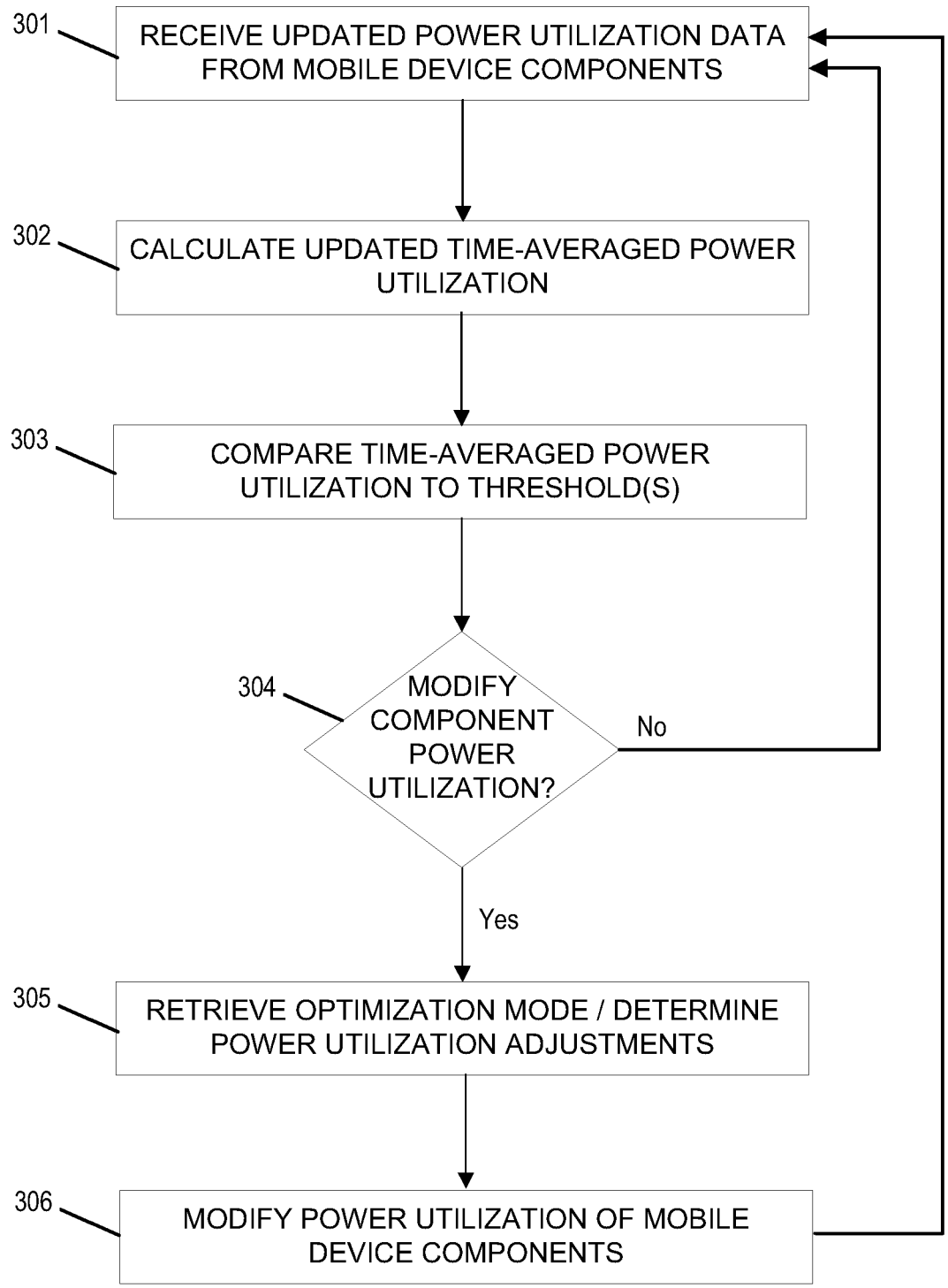
FIG. 3 is a flowchart illustrating a method for controlling power utilization within an example mobile device, according to embodiments of the present disclosure.

FIG. 3 is a flowchart illustrating an example process for controlling power utilization within a mobile device. As described below, the operations in this process may be performed by a mobile device 210, such as smartphone or other mobile device executing a power utilization control engine 220. Accordingly, the features and functionality may be described with reference to the devices and systems described above in FIG. 2. However, it should be understood that processes of monitoring power utilization among the RF emitting components of the mobile device 210, comparing the time-averaged power utilization data to thresholds based on RF emissions limits, and then determining and implementing modifications to the RF emitting components of the mobile device 210, described herein are not limited to the specific computing environment and systems described above, but may be performed within various other computing environments and systems.

In block 301, the power utilization control engine 220 of the mobile device 210 may receive updated power utilization data from one or more RF emitting components operating within the mobile device. The mobile device components from which data is received in block 301 may include any of the radio transceiver components 230 of the mobile device 210, such as Bluetooth radio, WLAN radio, LTE (or other cellular) wireless broadband radio, NFC controller, etc. As shown in FIG. 2, the data may be retrieved via host device drivers installed on the mobile device 210 and associated with each of the radio components. As noted above, the specific absorption rate (SAR) may be proportional to the power conducted by the mobile device components, and thus the power utilization control engine 220 may retrieve data including the conducted power levels, on-times, and off-times from each of the radio transceivers 230 and/or other RF emitting device components.

As discussed below, the power utilization data received in block 301 may be used to compute dynamic SAR averages repeatedly over a rolling time window. Accordingly, the power utilization control engine 220 may be configured to retrieve the power utilization data in block 301 in accordance with a predetermined time interval within the rolling time window. In various embodiments, power utilization data samples may be taken every 0.1 seconds, 0.2 seconds, 0.5 seconds, 1 second, and so on. For example, when using 0.1 second sampling times, and a rolling window averaging time of 100 seconds, 1000 sequential samples may be retrieved stored to generate the current dynamic SAR average, 600 sequential samples may be used for a 60 second rolling window averaging time, 300 sequential samples may be used for a 30 second rolling window averaging time, and so on. In some embodiments, when samples are collected from multiple different RF components 230 in block 301, the power utilization control engine 220 may be configured to specifically request data from a particular sampling time, and/or to verify the collection associated with the data sample, to ensure that the power utilization data samples received from different RF components 230 correspond to the same time interval. Thus, the power utilization control engine 220 may recalculate the current SAR utilization (or current power utilization) at the end of every monitoring period. the Further, it may be advantageous to collect and process power utilization data samples in real time, or near-real time, so that any subsequent modifications to the power utilization of the RF components may be performed responsive to the most recent power utilization data collected by the device.

In block 302, the power utilization control engine 220 may use the data retrieved over multiple iterations of block 301 to compute a time-averaged power utilization data. As noted above, the number of samples used in block 302 to calculate the time-averaged power utilization for a particular RF component 230 may depend on the sampling rate (e.g., 0.1 seconds, 0.5 seconds, etc.) and the length of the rolling window averaging time (e.g., 30 seconds, 60 seconds, 100 seconds, etc.).

In some embodiments, the techniques for dynamic SAR and power utilization control described herein may be applied to a single RF component 230. Thus, block 302 may involve averaging a previous N samples of power utilization data from a single RF component 230. However, in other examples, such as when the mobile device 210 includes multiple RF components 230 that may operate concurrently and/or when a single RF emission limit/threshold may apply to multiple RF components 230 or to an entire mobile device 210, then block 302 may include time-averaging the power utilization data from multiple different RF components 230. In some embodiments, a separate time-averaged power utilization value may be generated for each different RF components 230 in block 302, and then the different time-averaged values may be summed or aggregated in block 302 to determine a time-averaged power utilization value for the mobile device 210 as a whole.

In some embodiments, the power budget utilization during a particular monitoring period may be calculated using the following equations:

$$Pave = \left(\sum_{x=0}^{n} Px \cdot Tx\right) \div Tmon$$

$$Umon = Pave \div Plim$$

In this equation,
Pave=the average power per monitoring period
Px=transmission power
Tx=transmission duration with power Px
Plim=the current SAR power limit
Tmon=the monitor window duration, and
Umon=the SAR utilization per monitoring period.

Figure 4A:
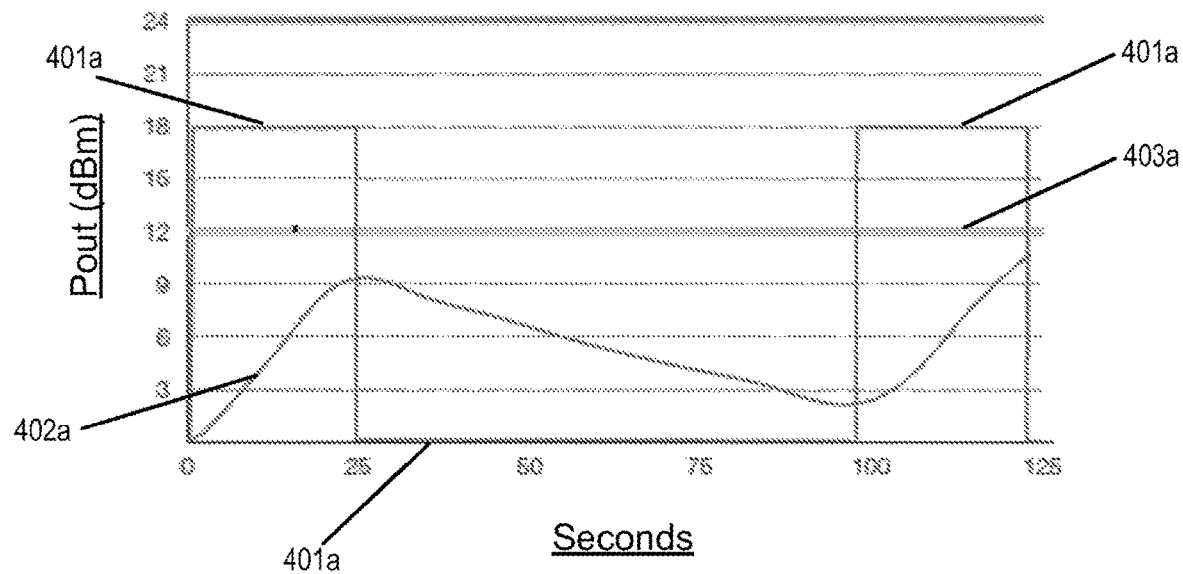
FIGS. 4A and 4B are example graphs illustrating power utilization readings within an example mobile device, according to embodiments of the present disclosure.
Figure 4B:
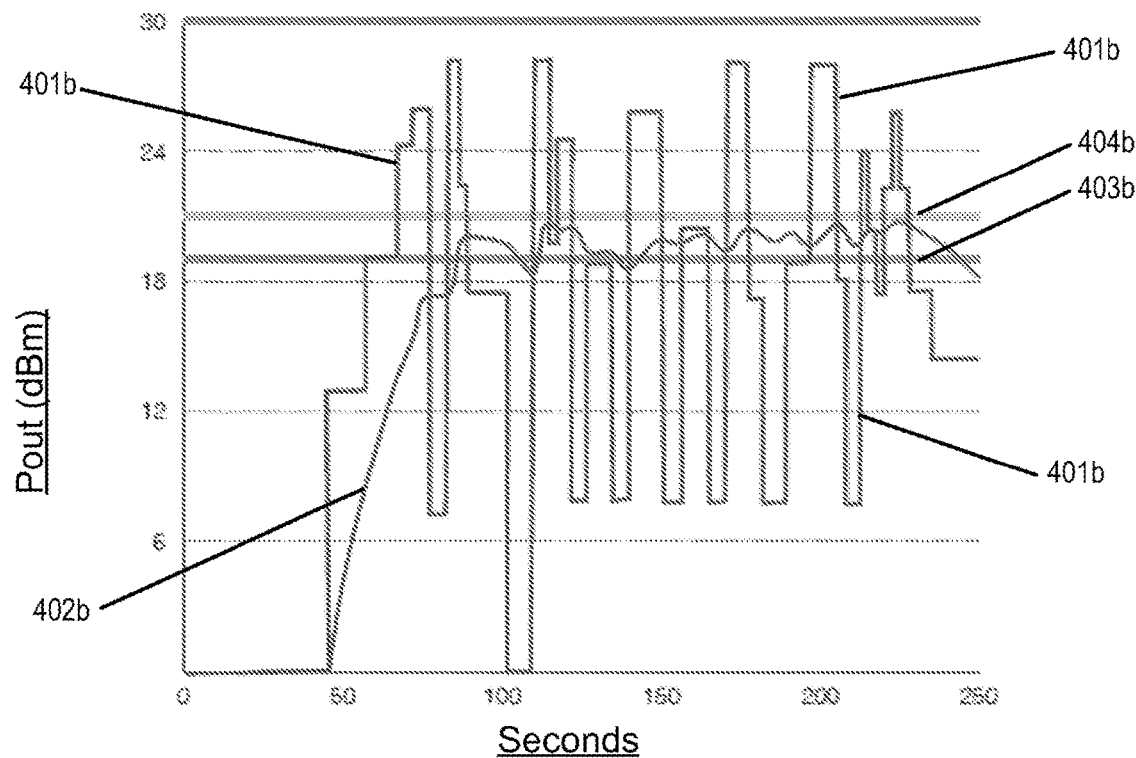

Referring briefly to FIGS. 4A and 4B, two example graphs are shown illustrating power utilization readings within a mobile device 210. In these examples, lines 401a and 401b represent the real-time power utilization data samples collected in block 301, while the curved lines 402a and 402b correspond to the time-averaged power utilization data generated in block 302. As these examples illustrate, large temporary increases or decreases in the power utilization of an RF component may have a relatively small real-time impact on the time-averaged power utilization data, depending on the length of the rolling window averaging time. As discussed below, this may allow for temporary increases in transmission power and/or duty cycle in order to optimize transmission quality without exceeding the RF emission limit for the current rolling time window.

In some embodiments, additional techniques may be used for tracking transmission power for WLAN RF components 230b. For instance, modern WLAN radio might not stay at the same channel all the time, but instead may maintain multiple connections (e.g., Infra+Apple Wireless Direct Link (AWDL)/Neighbor Awareness Networking (NAN)) and perform off-channel scans and roams between different AP resulting in variations in SAR limits. External events like head/body detection and LTE-COEX, BT-COEX also may affect SAR limits for WLAN radio. Thus, in a general case the SAR limit (or power utilization limit) may be different per frame. Additionally, WLAN radio components 230b may transmit on one or any combination of chains and may use different antennas. SAR limits may be defined per antenna, and thus the Tx power usage may be tracked per antenna in such cases. Further, in order to accommodate for all the requirements based on the available capabilities, the power utilization control engine may track total transmit time and per packet Tx power delta from the actual SAR limit at the time of transmission. In such cases, the following equation may be used to calculate the SAR utilization per monitoring period (this equation may be calculated per antenna for each RF component 230):

$$U = \frac{Plim \times \sum_{x=1}^{n} tx + \sum_{x=1}^{n} \Delta P \times tx}{Plim \times T}$$

In this equation,
Plim=the SAR limit
ΔP=Frame Tx power delta from SAR limit
T=monitoring period duration
tx=frame duration Additionally, SAR budget utilization for an SDB WLAN system may be calculated from the set of per monitor period samples for both radios collected over the duration of the observation window (twin) for each antenna, using the following equation:

$$SAR = \left(\sum_{x=0}^{n} U1x \cdot T1x + \sum_{x=0}^{n} U2x \cdot T2x\right) \div Twin$$

In this equation,
SAR=the SAR utilization
Twin=the observation window duration
U1x, T1x=the SAR utilization per monitoring period and its duration samples radio 1
U2x, T2x=the SAR utilization per monitoring period and its duration samples radio 2

The SAR utilization data per each antenna 235 and for every monitoring period may be collected and stored by the power utilization control engine 220, for the observation window duration (Twin). During each monitoring period, the data collected may include a timestamp, period duration, the total transmission duration during the period, the SAR limit during the period (e.g., which may be expressed in mW, and which may be averaged or the min may be selected), the actual transmission duty cycle during the period (as a percentage %), the SAR utilization during the period (as a percentage %), and the accumulated transmission power consumption relative to the SAR limit, which may be calculated using the following equation:

$$\sum_{x=1}^{n}((Plimx - Px) \times Tx)$$

In this equation,
Plimx=the SAR limit
Px, Tx=the frame power and duration

Additionally, power utilization control engine 220 may calculate and store the following data, for each antenna averaged over the duration of the observation window and aggregated for all radios connected to the antenna: SAR budget utilization (as a %), Total Tx duty cycle (as a %), and Total Tx duration (secs)

In block 303, the power utilization control engine 220 may compare the time-averaged power utilization data for the current rolling time window, to one or more thresholds based on the applicable RF exposure limits. Because the specific absorption rate (SAR) may be proportional to the power utilized by the mobile device 210, the power utilization control engine 220 may use the time-averaged power utilization data as a proxy for determining whether or not the mobile device 210 is in compliance with the applicable SAR limits. As noted above, in various embodiments the SAR limits may be per-antenna power utilization limits, per-radio power utilization limits, and/or per-device power utilization limits.

Additionally, the SAR limits for RF energy exposure to users may depend on the proximity and position of the mobile device 210 with respect to the user. Accordingly, block 303 may also include selecting the appropriate threshold(s) based on the current proximity and positioning of the mobile device 210. For example, the power utilization control engine 220 may access the current device usage data as well as the devices sensors 250 such as location sensors, movement (e.g., acceleration) sensors, and orientation (e.g., gyroscopic sensors) in order to determine whether the mobile device is being held by, is attached to, or is otherwise on the person of the user. The power utilization control engine 220 also may use the sensor data to determine the specific distance of the device and/or particular antennas 235 from the user's skin, and the region/part of the user being exposed to the RF emissions (e.g., head, body, extremities, etc.). For instance, for smartphone 210 that have capabilities of determining when a user is holding and talking or listening directly into the mouthpiece or speakers of the phone, the power utilization control engine 220 may use this capability to determine when the user's head is being exposed to the RF emissions, as opposed to the user's body or extremities, and may apply the appropriate threshold.

In some cases, the power utilization control engine 220 may determine in block 303 that proximity and positioning of the mobile device 210 with respect to the user has changed during the course of the current rolling time window. For instance, assuming that a 60 second rolling window averaging time is being used, the power utilization control engine 220 may detect that the user was holding the mobile device 210 up to his/her head for the most recent 20 seconds, but for the 40 seconds prior to that the mobile device 210 was in the user's pocket. In some embodiments when a change in the proximity and positioning of the mobile device 210 is detected during the rolling window, the power utilization control engine 220 may simply reset the data and begin a new rolling calculation. However, in other embodiments, the power utilization control engine 220 may calculate a dynamic threshold on-the-fly based on the available data over the previous rolling time window. For example, a dynamic power utilization threshold may be determined based on (a) a first threshold associated with a first position/proximity of the mobile device 210, (b) the amount of time within the last rolling window that the mobile device 210 was in the first position/proximity, (c) a second threshold associated with a second position/proximity of the mobile device 210, (b) the amount of time within the last rolling window that the mobile device 210 was in the second position/proximity, and so on.

Referring again to FIGS. 4A and 4B, within the two graphs shown in these examples, the straight horizontal lines 403a, 403b, and 404b may represent time-averaged power utilization thresholds for rolling time windows. Thus, in FIG. 4A, immediately following each updated calculation of the time-averaged power utilization in block 302, the resulting current time-averaged value 402a may be compared to the power utilization threshold value 403a. In the example shown in FIG. 4A, the time-averaged power utilization value 402a fluctuates but always stays below the threshold value 403a, even at times when the current power utilization 401a exceeds the threshold 403a. As shown in this example, in response to updated power utilization data reading that is received, corresponding to new most recent time interval, the power utilization control engine 220 may first generate an updated set of power utilization data readings by replacing an oldest power utilization data reading from the previous set within the plurality of power utilization data readings corresponding to the first time window, with the updated power utilization data reading, and then calculating an updated time-averaged power utilization based at least in part on the updated set of power utilization data readings.

In FIG. 4B, another example is shown in which multiple different thresholds 403b and 404b may be used, to allow the power utilization control engine 220 to better optimize and fine-tune the transmission parameters and capabilities of the mobile device 210. For example, in FIG. 4B, immediately following each updated calculation of the time-averaged power utilization in block 302, the resulting current time-averaged value 402b may be compared to a first power utilization threshold value 403b. If the current time-averaged value 402b exceeds the first threshold 403b, then the subsequent adjustment to the RF components 230 may be a relatively minor reduction in the transmission power or duty cycle, etc., whereas if the current time-averaged value 402b exceeds both the first threshold 403b and the second threshold 404b, then the resulting modification to the RF components 230 may be a larger reduction in the transmission power or duty cycle, the deactivation of one or more RF components 230 or antennas 235, etc. Alternatively, if the current time-averaged value 402b is lower than both the first threshold 403b and the second threshold 404b, then the resulting modification to the RF components 230 may correspond to an increase in the transmission power and/or duty cycle in order to improve transmission performance and signal quality. Although two different thresholds 403b and 404b are used in this example, it should be understood that three or more different threshold may be used to better optimize and fine tune the performance of the RF components 230 while continuously monitoring the applicable RF exposure limit for the current rolling window in order to prevent the RF components 230 from exceeding that limit.

In block 304, based on the comparison between the time-averaged power utilization data for the current rolling time window, and the one or more thresholds based on the applicable RF exposure limits, the power utilization control engine 220 may determine whether or not the operation of one or more of the RF components 230 on the device is to be modified. For example, if the power utilization control engine 220 determines that the current power utilization data for the mobile device 210 is at or close to an optimal performance level, then the power utilization control engine 220 may determine using local-based rules that the operation of the RF components 230 should not be modified (304: No).

In contrast, if the power utilization control engine 220 identifies one or more potential optimizations (304: Yes), then the power utilization control engine 220 may determine the particular RF components 230 in block 305. As discussed above, the potential RF component 230 modifications that determined in block 305 may include one or more of: adjusting the transmission power level up or down for a particular RF component 230 and/or antenna 235, adjusting the transmission duty cycle up or down for a particular RF component 230 and/or antenna 235, or activating or deactivating a particular RF component 230 and/or antenna 235. A set of logical rules stored by and/or executed by the power utilization control engine 220 may be used to determine the set of RF component 230 modifications to be performed in block 305, based on the time-averaged power utilization data in the current rolling window and based on the various thresholds. Additionally, the power utilization control engine 220 may retrieve and use related data such as a predetermined optimization mode, configuration settings, prioritization data, etc., to determine the particular RF component 230 modifications to be performed.

Figure 5:
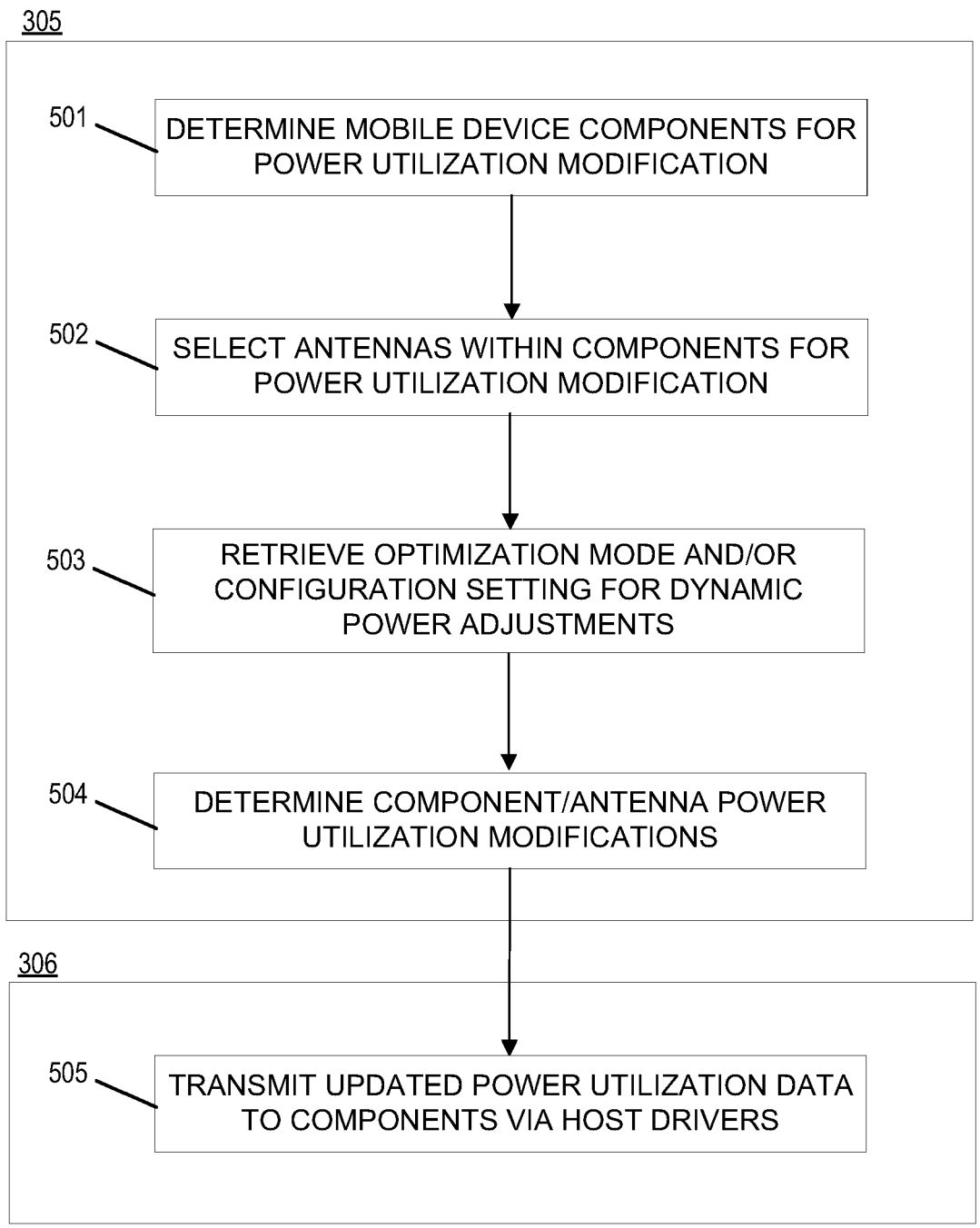
FIG. 5 is another flowchart illustrating example techniques for controlling power utilization within a mobile device, according to embodiments of the present disclosure.

For example, referring briefly to FIG. 5, another flowchart is shown illustrating various techniques for determining the particular RF component 230 modifications to be performed in block 305. Specifically, 501-504 illustrate particular determination techniques, related underlying data, and criteria that may be used to determine which RF component 230 modifications should be applied in block 305. It should be understood that different subsets of these techniques, data, and/or criteria for determining RF component 230 modifications may be used in different embodiments and for different mobile devices 210.

In block 501, the power utilization control engine 220 may determine the particular components on the mobile device 210 that to receive a power utilization modification. As noted above, such components may include any RF emitting component operating on the mobile device 210, including but not limited to various radio transceivers 230 and/or radio antennas 235. In some cases, RF emission limit may be an antenna-specific or radio-specific limits, and thus the determination of the particular components in block 501 may simply correspond to the same components that were subject to the threshold comparison in block 303. In other cases, RF emission limits (and corresponding power utilization limits) may be associated with mobile device 210 as a whole (or at least multiple different RF components 230). In such cases, the power utilization control engine 220 may use configuration data that identifies a priority among the different RF components 230, indicating which components are to incur transmission power reductions or duty cycle reductions first, which components are to be deactivated first, and which components are not to incur any performance degradations, deactivations, etc.

In block 502, the power utilization control engine 220 may select one or more of the antennas 235 within the selected RF components 230 on which to apply the modification. In cases where a particular RF component 230 uses only one antenna 235, then that antenna may be selected by default. In other cases, logical rules may be used to select one or more particular antennas 235 on which to apply the modification. Additionally, in some cases, the modification may include switching from one antenna to another in response to certain threshold comparisons to the current SAR budget utilization.

In block 503, the power utilization control engine 220 may retrieve an optimization mode and/or other configuration settings that may be used to determine the particular type of RF component 230 modification. In certain embodiments, two alternative optimization modes may be supported: a transmission power optimization mode in which the rate-at-range of transmissions may be maximized, and a latency optimization mode in which transmission power is capped but transmissions are not delayed. Other types of configuration parameters retrieved in block 504 may include priority data between different RF components 230, antennas 235, and/or different types of communications, mobile applications, or communication modes/protocols.

In block 504, the power utilization control engine 220 may finally determine the particular RF component(s) 230, antenna(s) 235, and the particular power utilization modifications based on an analysis of and application of logical rules to the data received in blocks 501-503. As noted above, the determined power utilization modifications for particular RF components 230 and antennas 235 may include transmission power level adjustments up or down, transmission duty cycle adjustments up or down, activation or deactivation of particular components, etc. The determination may be performed based on sets of logical rules stored by and/or executed by the power utilization control engine 220, based on the time-averaged power utilization data in the current rolling window and based on the various thresholds, using the related data such as the optimization mode, configuration settings, prioritization data, and the like.

In block 505, the modifications determined in block 504 to the RF component(s) 230 and/or antenna(s) 235 may be implemented, thereby effectively modifying the power utilization of those components. In some embodiments, such as in block 505 of FIG. 5, the power utilization control engine 220 may access the selected RF component(s) 230 via their respective host drivers in order to transmit the modifications to the RF component(s) 230 and/or antenna(s) 235. The instructions to modify the transmission behaviors or capabilities may take the form of transmission parameters and/or functionalities transmitted to the RF component(s) 230, such as updated transmission power levels, updated duty cycle parameters, component or antenna start-up or shut-down instructions, etc., which may be transmitted as parameters via an application programming interface (API) or other interface.

Figure 6:
FIG. 6 is an example graph illustrating example power utilization accumulation data within a mobile device, according to embodiments of the present disclosure.

FIG. 6 is a graph illustrating an example of power utilization accumulation data within a mobile device 210. This example may correspond to an RF component 230 such as an LTE radio component 230c having two antennas 235c each of which may support both 2G network and 5G network communications. In this example, the initial transmission power (TXpower) may be defined as the minimum between the PPM (which may be the per rate transmission power limits that are EVM and mask compliant) and the CLM (which may correspond to regulatory compliance limits associated with the current country and channel, but not including SAR regulations), and the initial transmission cap (TX CAP) may correspond to the entry in the graph for that antenna.

In this example, the SAR budget utilization for Antenna 0 for period 611 may be calculated as TXpower (601)/TX CAP (601), which corresponds to the ratio of the TX power to the TX CAP. Further, the TX CAP (601) at this point in time for Antenna 0 is based on at least: the network (2G), the user exposure type (head|body), the LTE state, and MIMO/SISO/SDB. Similarly, the SAR budget utilization for Antenna 1 for period 616 may be calculated as TXpower (607)/TX CAP (607), which similarly corresponds to the ratio of the TX power to the TX CAP. Further, the TX CAP (607) at this point in time for Antenna 1 is similarly based on at least: the network (2G), the user exposure type (head|body), the LTE state, and MIMO/SISO/SDB.

Referring now to time period 613 for Antenna 0, the SAR budget utilization for Antenna 0 for this time period may be calculated as TXpower (605)/TX CAP (605), which again corresponds to the ratio of the TX power to the TX CAP, and the TX CAP (605) at this point in time for Antenna 0 is based on at least: the network (5G), the user exposure type (head|body), the LTE state, and MIMO/SISO. In contrast, the SAR budget utilization for Antenna 0 during this time period equals zero (0)/TX CAP (607).

Referring now to time period 615 for Antenna 0, the SAR budget utilization for Antenna 0 for this time period may be calculated as ((TXpower (604)/TX CAP (604))+((TXpower (606)/TX CAP (606)). In this case, TX CAP (604) and TX CAP (606) for Antenna 0 are both based on at least: the network (2G), the user exposure type (head|body), the LTE state, and MIMO/SISO/SDB.

Figure 7A:
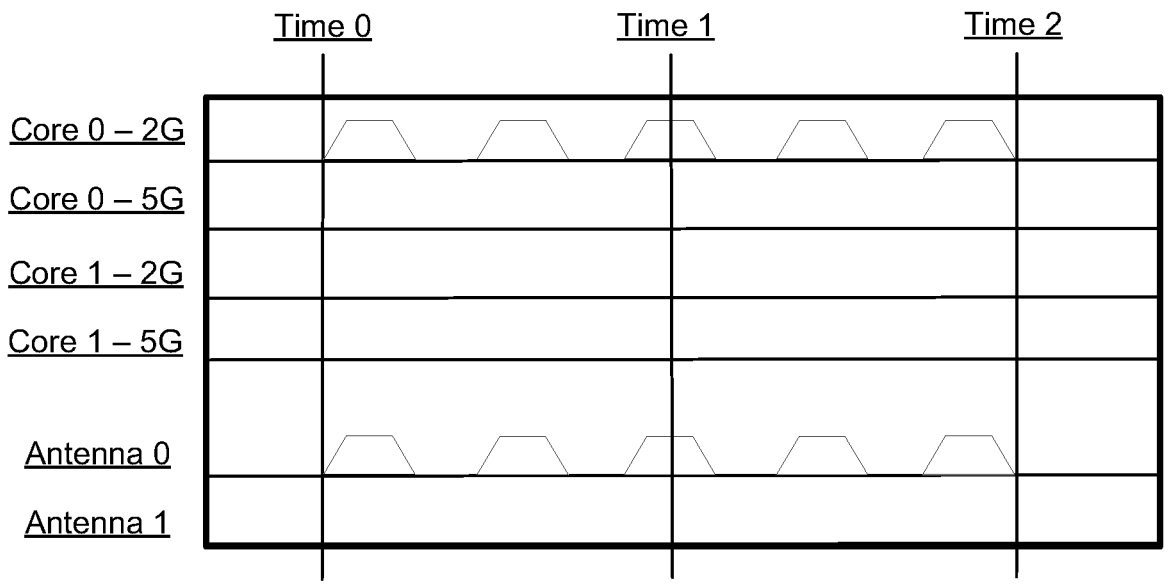
FIGS. 7A-7D are example graphs illustrating example power utilization readings and dynamic power control modifications within a mobile device, according to embodiments of the present disclosure.
Figure 7B:
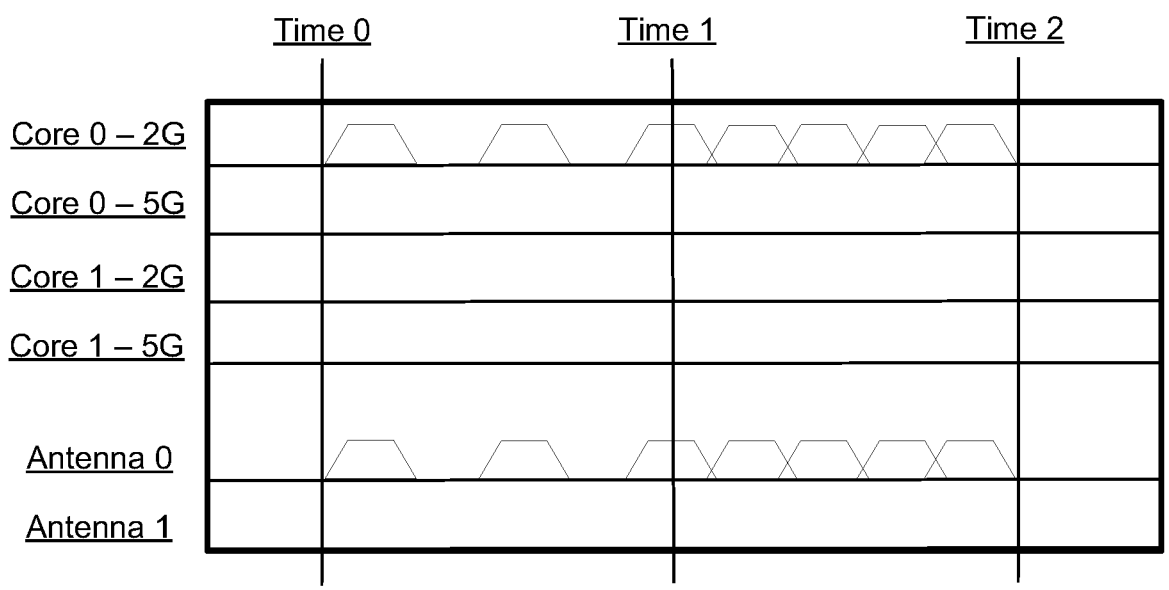
Figure 7C:
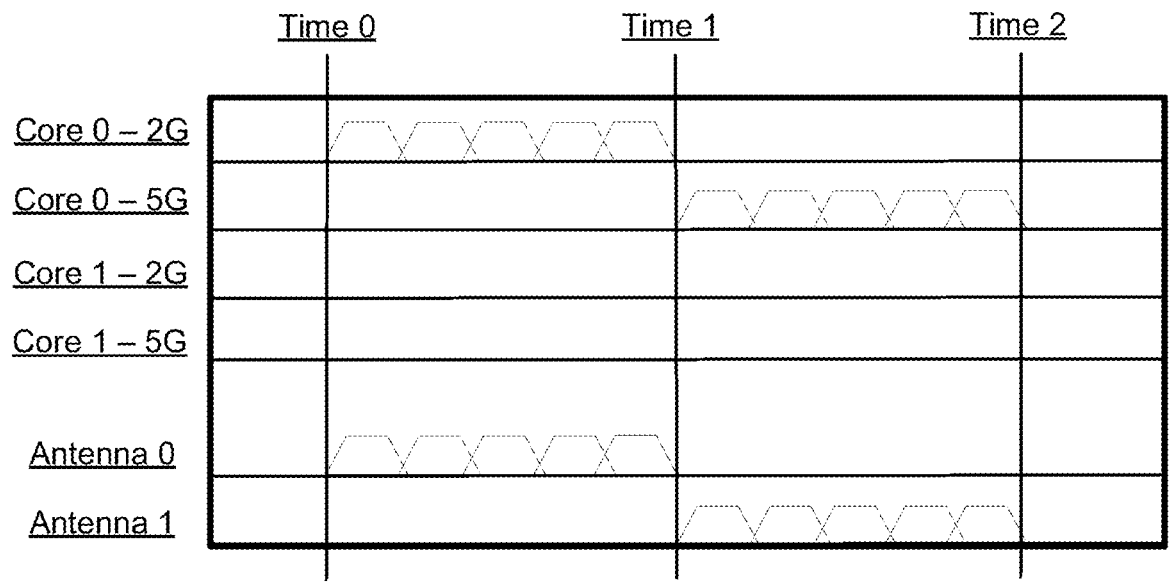

FIGS. 7A-7D are example graphs illustrating power utilization readings and dynamic power control modifications within a mobile device. In FIGS. 7A-7C, three separate time points are identified (Time 0, Time 1, and Time 2) corresponding to time intervals during which power utilization data may be retrieved, and at which a resulting set of modifications may be determined and applied to the RF components.

Referring first to the example in FIG. 7A, in this example a 25% transmission duty cycle may be used at 3 dB above the TX CAP limit, and TX CAP limit may be 50% of the power budget utilization. In order to better illustrate the techniques herein, it may be assumed that, if all of the transmission levels in this example are 3 dB above the TX CAP limit, then: it may be assumed that the RF component is at 50% of the power budget utilization just before Time 0, at Time 1 and time 2, the RF component is at 25% duty cycle for one each second, and the accumulated power budget utilization (or SAR budget utilization) for Antenna 0 may be at 50% of its maximum allowable power utilization for the previous one second, and 50% of its maximum allowable power utilization for the previous 60 seconds. Then, at Time 2, the accumulated power budget for Antenna 0 would be at 50% for the previous one second and 50% for the previous 60 seconds.

Referring to the second example in FIG. 7B, in this example it may be assumed again that all transmission levels are 3 dB above the TX CAP limit. Then, assuming again that the RF component is at 50% of the power budget utilization just before Time 0, and at Time 0 and Time 1 the RF component may be at a 25% transmission duty cycle. At Time 1, the RF component 230 in this example is shown as being transitioned to a 100% transmission duty cycle. Thus, at Time 1, the power budget utilization for Antenna 0 would be 50% for the previous one second and at 50% for the previous 60 seconds. At Time 2, the power budget utilization for Antenna 0 would be at 200% for the previous one second and 52.5% for the previous 60 seconds.

Referring to the third example in FIG. 7C, in this example it may be assumed again that all transmission levels are 3 dB above the TX CAP limit, and it may also be assumed that there were no transmissions before Time 0 (and thus 0% power budget utilization). At Time 1, the RF component 230 has been transmitting at 100% duty cycle for one second. Therefore, at Time 1, the power budget utilization for Antenna 0 would be 200% for the previous one second and 3.33% for the previous 60 seconds, and the power budget utilization for Antenna 1 would be 0% for the last 1 second and also 0% for the previous 60 seconds. Then at Time 2 (one second later than Time 1), the power budget utilization for Antenna 0 would be 0% for the previous one second and 3.33% for the previous 60 seconds, and the power budget utilization for Antenna 1 would be 200% for the previous one second and 3.33% for the previous 60 seconds.

Figure 7D:
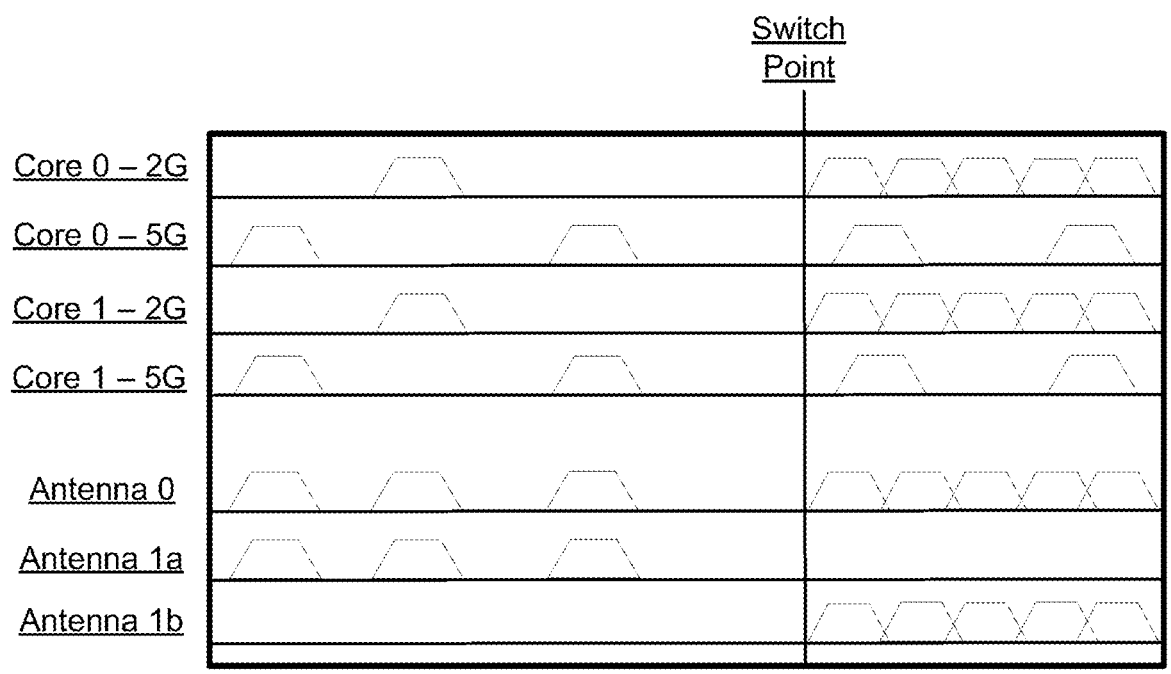

Referring to the fourth example in FIG. 7D, this example illustrates an antenna diversity in an embodiment where Antenna 1a and Antenna 1b are both connected to Core 1 (e.g., through a 1P2T or SPDT switch). The vertical line in FIG. 7D represents a diversity switch point. Prior to the diversity switch point, the RF component is 50% power budget utilization on both Antennas 1a and 1b before the time shown in the graph, and the RF component is at 12.5% transmission duty cycle with 3 dB above the TX CAP on all 4 chains before the switch, resulting in a stable 50% power budget utilization on each antenna prior to the switch point. Then, at the diversity switch point, the RF component 230 is modified to move all transmissions from Antenna 1a to Antenna 1b. In this case, still 3 dB above TX CAP on all cores, the RF component may be moved to 100% transmission duty cycle on 2G, and 50% duty cycle on 5G, resulting in 300% power budget utilization on Antenna 0 and Antenna 1b. Then at the end of the waveform in FIG. 7D (e.g., one second after the switch point), Antenna 0 is at 300% of the power budget utilization for the previous one second and 54.2% for the previous 60 seconds, the power budget utilization for Antenna 1a is at 49.1% for the previous 60 seconds, and the power budget utilization for antenna 1b is at 300% for the previous second and 5% for the previous 60 seconds.

Figure 8:
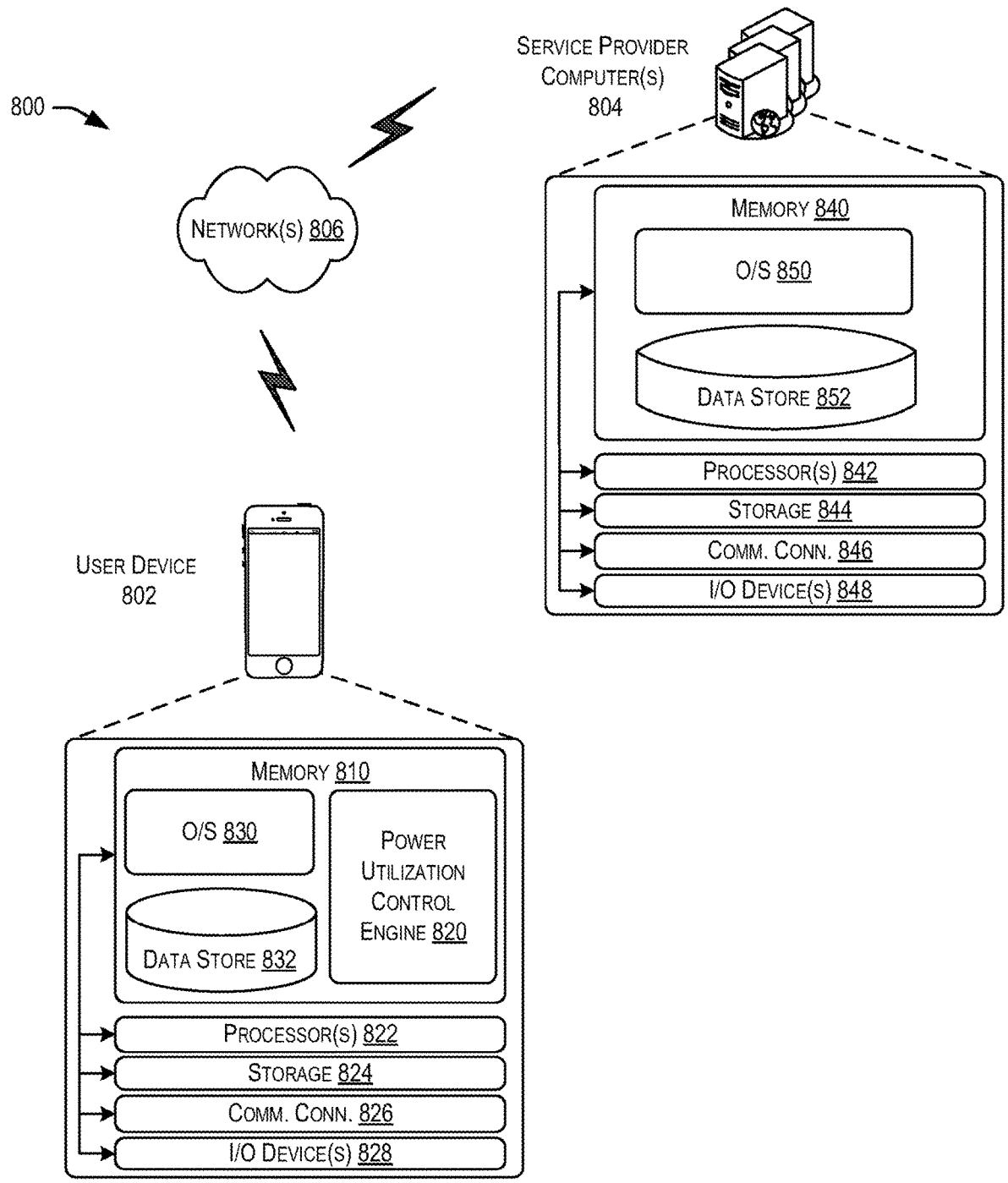
FIG. 8 is a block diagram illustrating an example mobile device and example server/service provider computer(s) of a dynamic power utilization control system, according to embodiments of the present disclosure.

FIG. 8 illustrates components of a mobile device and server/service provider computer(s) of a dynamic power utilization control system 800 according to at least one embodiment. As noted above a dynamic power utilization control system 800 also may be referred to as a system for dynamically controlling specific absorption rate (dynamic SAR). System 800 may include a user device 802 (e.g., a mobile device) and/or server/service provider computer(s) 804 that may communicate with one another via network(s) 806 utilizing any suitable communications protocol.

In some examples, the network(s) 806 may include any one or a combination of many different types of networks, such as cable networks, the Internet, wireless networks, cellular networks, and other private and/or public networks. While the illustrated example represents the user device 802 communicating with the service provider computer(s) 804 over the network(s) 806, the described techniques may equally apply in instances where the user device 802 interacts with the service provider computer(s) 804 over a landline phone, via a kiosk, or in any other suitable manner. It should be appreciated that the described techniques may apply in other client/server arrangements, as well as in non-client/server arrangements (e.g., locally stored applications, etc.). For example, in some embodiments, some or all of the subcomponents of the power utilization control engine 820, discussed below in more detail, may operate in whole or in part remotely from the user device 802 on the service provider computer(s). Additionally, the user device 802 may access the functionality of the service providers 804 via user interfaces and/or APIs provided by the components of the service providers.

As noted above, the user device 802 may be configured to execute or otherwise manage applications or instructions for performing dynamic power utilization control of various power-emitting components (e.g., radios, transmitters, antennas, etc.) within a mobile device. The mobile device 802 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the user device 802 may include at least one memory 810 and one or more processing units (or processor(s)) 822. The processor(s) 822 may be implemented as appropriate in hardware, computer-executable instructions, or combinations thereof. Computer-executable instruction or firmware implementations of the processor(s) 822 may include computer-executable or machine-executable instructions written in any suitable programming language to perform the various functions described.

The memory 810 may store program instructions that are loadable and executable on the processor(s) 822, as well as data generated during the execution of these programs. Depending on the configuration and type of the mobile device 802, the memory 810 may be volatile (such as random-access memory (RAM)) and/or non-volatile (such as read-only memory (ROM), flash memory, etc.). The mobile device 802 may also include additional removable storage and/or non-removable storage 824 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 810 may include multiple different types of memory, such as static random-access memory (SRAM), dynamic random-access memory (DRAM), or ROM. While the volatile memory described herein may be referred to as RAM, any volatile memory that would not maintain data stored therein once unplugged from a host and/or power would be appropriate.

The memory 810 and the additional storage 824, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 810 and the additional storage 824 are both examples of non-transitory computer storage media. Additional types of computer storage media that may be present in the mobile device 802 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the mobile device 802. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The mobile device 802 may also contain communications connection(s) 826 that allow the mobile device 802 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The mobile device 802 may also include I/O Device(s) 828, such as a touch input device, an image capture device, a video capture device, a keyboard, a mouse, a pen, a voice input device, a display, a speaker, a printer, etc.

Turning to the contents of the memory 810 in more detail, the memory 810 may include an operating system 830 and/or one or more application programs or services for implementing the features disclosed herein. The memory 810 may include data store 832 which may be configured to store, for example, power utilization limits and readings from various components of the mobile device 802, as well as configuration data, optimization mode, and the like, which may be used by the power utilization control engine 820 in providing dynamic power utilization control functionality on the mobile device 802.

In some examples, the power utilization control engine 820 may be configured to access host device drivers associated with mobile device components such as radio components, antennas, battery components, and other power-emitting components of the mobile device 802 (and/or peripheral devices associated with the user device 802). As part of providing dynamic specific absorption rate (SAR) functionality, the power utilization control engine 820 may be configured to retrieve power utilization readings, for example, from data store 832 and/or directly from host device drivers, and to access configuration/mode data, transmission or RF energy absorption limit data, etc.

In some aspects, the service provider computer(s) 804 may be any suitable type of computing devices such as, but not limited to, a mobile device, a laptop computer, a desktop computer, a server computer, a thin-client device, a tablet PC, etc. Additionally, it should be noted that in some embodiments, the service provider computer(s) 804 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 804 may be in communication with the mobile device 802 via the network(s) 806. The service provider computer(s) 804 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 804 may include at least one memory 840 and one or more processing units (or processor(s)) 842. The processor(s) 842 may be implemented as appropriate in hardware, computer-executable instructions, firmware, or combinations thereof. Computer-executable instruction or firmware implementations of the processor(s) 842 may include computer-executable or machine-executable instructions written in any suitable programming language to perform the various functions described.

The memory 840 may store program instructions that are loadable and executable on the processor(s) 842, as well as data generated during the execution of these programs. Depending on the configuration and type of service provider computer(s) 804, the memory 840 may be volatile (such as RAM) and/or non-volatile (such as ROM, flash memory, etc.). The service provider computer(s) 804 or servers may also include additional storage 844, which may include removable storage and/or non-removable storage. The additional storage 844 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 840 may include multiple different types of memory, such as SRAM, DRAM, or ROM.

The memory 840, the additional storage 844, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 840 and the additional storage 844 are all examples of computer storage media. Additional types of computer storage media that may be present in the service provider computer(s) 804 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 804. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 804 may also contain communications connection(s) 846 that allow the service provider computer(s) 804 to communicate with a stored database, another computing device (e.g., the user device 802) or server, user terminals and/or other devices on the network(s) 806. The service provider computer(s) 804 may also include I/O device(s) 848, such as a keyboard, a mouse, a pen, a voice input device, a touch input device, a display, speakers, a printer, etc.

Turning to the contents of the memory 840 in more detail, the memory 840 may include an operating system 850, one or more data stores 852, and/or one or more application programs, modules, or services for implementing the features disclosed herein. In at least one embodiment, service provider may include one or more modules configured to retrieve or determine optimization modes and/or additional configuration data to be transmitted to the user device 802 and/or additional networks of related user devices. For instance, a service provider computer(s) 804 may push such transmission power optimization and configuration parameters to networks of associated computer in order to implement and update particular dynamic SAR (or dynamic power utilization control) policies at the network-level or organization-level.

The mobile device 802 may be configured with a power utilization control engine 820 to implement the techniques and functionality of dynamic SAR described herein. Although not illustrated in FIG. 8, the mobile device 802 also may include additional underlying hardware and software components and modules to support the power utilization control functionality, including device sensors used for detecting device proximity and orientation with respect to the device user (e.g., device remote from user, device held near body, device held near head, etc.), at specific times that may be correlated with the power utilization of the various device radios and other components. Thus, the user device 802 may capture device movement data, location, orientation data, usage data, and user interaction data from the device sensors and other components, and analyze the data in conjunction with the power utilization readings received from various device components. Based on analyses techniques that may be performed within the various modules of the mobile device 802, a current time-averaged RF energy user exposure amount may be determined, and the operation and power utilization of various device components (e.g., radios, antennas, etc.) may be modified to optimize both transmission capabilities and compliance with dynamic SAR limitations.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art Further, as described above, one aspect of the present technology is the gathering and use of data available from various sources to improve the transmission capabilities and limit the radio frequency (RF) energy exposure to device users. The present disclosure contemplates that in some instances, this gathered data may include personal information data that uniquely identifies or can be used to contact or locate a specific person. Such personal information data can include demographic data, location-based data, device usage data and patterns, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine application and people suggestions for sharing content that is of greater interest to the user. Accordingly, use of such personal information data enables users to more efficiently control sharing of content. Further, other uses for personal information data that benefit the user are also contemplated by the present disclosure. For instance, device usage patterns and/or health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing of content objects, the present technology can be configured to allow users to select to "opt in" or "opt out" of participation in the collection of personal information data during registration for services or anytime thereafter. In another example, users may select not to provide data corresponding to their previous interactions with various applications, along with their sharing preferences and/or historical user interactions. In yet another example, users can select to limit the length of time that previous application interactions and sharing data is maintained or entirely prohibit the collection and tracking of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggestions for sharing applications and people may be selected and provided to users based on non-personal information data or a bare minimum amount of personal information, such as the content being requested by the device associated with a user, other non-personal information available to the content sharing systems, or publicly available information.

What is claimed is:

1. A wireless communication device comprising:
a first radio;
a second radio; and
processor circuitry for a power utilization control engine coupled to the first radio and the second radio, the processor circuitry being configured to
calculate a time-averaged power utilization value based at least in part on power utilization data for the first radio across a time period and power utilization data for the second radio across the time period, and
adjust power utilization of at least one of the first radio, the second radio, or an additional radio component based at least in part on the time-averaged power utilization value.

2. The wireless communication device defined in claim 1, wherein the processor circuitry is configured to update the time-averaged power utilization value based on a rolling time window.

3. The wireless communication device defined in claim 2, wherein the processor circuitry is configured to calculate an updated time-averaged power utilization value based at least in part on a portion of the power utilization data for the first radio across the time period, power utilization data for the first radio from outside of the time period, a portion of the power utilization data for the second radio across the time period, and power utilization data for the second radio from outside of the time period.

4. The wireless communication device defined in claim 3, wherein the power utilization data for the first radio from outside of the time period and the power utilization data for the second radio from outside of the time period are from an additional time period subsequent to the time period.

5. The wireless communication device defined in claim 1, wherein the power utilization data for the first radio across the time period is indicative of transmission power utilization of the first radio across the time period.

6. The wireless communication device defined in claim 5, wherein the power utilization data for the second radio across the time period is indicative of transmission power utilization of the second radio across the time period.

7. The wireless communication device defined in claim 1, wherein the first radio and the second radio are each a Bluetooth radio, a wireless local area network (WLAN) radio, or a Long-Term Evolution (LTE) wireless broadband radio.

8. The wireless communication device defined in claim 1, wherein the processor circuitry is configured to adjust the power utilization of at least one of the first radio, the second radio, or the additional radio component at least in part by adjusting a transmission power level or a transmission duty cycle of at least one of the first radio, the second radio, or the additional radio component.

9. A wireless communication device comprising:
a first radio;
a second radio; and
processor circuitry for a power utilization control engine coupled to the first radio and the second radio, the processor circuitry being configured to
calculate a power utilization value indicative of power utilization of the first radio across a time period and power utilization of the second radio across the time period,
compare the power utilization value with a threshold value, and
adjust a transmission characteristic of at least one of the first radio, the second radio, or an additional radio component based at least in part on the comparison of the power utilization value with the threshold value.

10. The wireless communication device defined in claim 9, wherein the processor circuitry is configured to adjust the transmission characteristic of at least one of the first radio, the second radio, or the additional radio component at least in part by adjusting a transmission power level of the first radio.

11. The wireless communication device defined in claim 9, wherein the processor circuitry is configured to adjust the transmission characteristic of at least one of the first radio, the second radio, or the additional radio component at least in part by adjusting a transmission duty cycle of the first radio.

12. The wireless communication device defined in claim 9, wherein the processor circuitry is configured to adjust the transmission characteristic of at least one of the first radio, the second radio, or the additional radio component at least in part by activating or deactivating the additional radio component.

13. The wireless communication device defined in claim 9, wherein the power utilization of the first radio across the time period comprises transmission power utilization of the first radio across the time period.

14. The wireless communication device defined in claim 13, wherein the power utilization of the second radio across the time period comprises transmission power utilization of the second radio across the time period.

15. The wireless communication device defined in claim 9, wherein the first radio and the second radio are each a Bluetooth radio, a wireless local area network (WLAN) radio, or a Long-Term Evolution (LTE) wireless broadband radio.

16. The wireless communication device defined in claim 9, wherein the processor circuitry is configured to update the power utilization value based on a rolling time window.

17. A wireless communication device comprising:
a first radio component for wireless communication;
a second radio component for wireless communication; and
processing circuitry for a power utilization control engine coupled to the first radio component and the second radio component, the processing circuitry being configured to
calculate a time-averaged power utilization value indicative of power utilization of the first radio component across a time period and power utilization of the second radio component across the time period,
compare the time-averaged power utilization value with a threshold value, and
adjust power utilization of at least one of the first radio component, the second radio component, or a third radio component based at least in part on the comparison of the time-averaged power utilization value with the threshold value.

18. The wireless communication device defined in claim 17, wherein the processing circuitry is configured to update the time-averaged power utilization value based on a rolling time window.

19. The wireless communication device defined in claim 17, wherein processing circuitry is configured to calculate an updated time-averaged power utilization value indicative of power utilization of the first radio component across a portion of the time period, power utilization of the first radio component from outside of the time period, power utilization of the second radio component across the portion of the time period, and power utilization of the second radio component from outside of the time period.

20. The wireless communication device defined in claim 17, wherein the first radio component and the second radio component are each a Bluetooth radio component, a wireless local area network (WLAN) radio component, or a Long-Term Evolution (LTE) wireless broadband radio component.

* * * * *